United States Patent
Hyuong et al.

(10) Patent No.: US 7,818,381 B2
(45) Date of Patent: Oct. 19, 2010

(54) SYSTEM FOR SENDING, RECEIVING AND DISPLAYING MESSAGE, METHOD FOR SENDING, RECEIVING AND DISPLAYING MESSAGE AND COMPUTER READABLE STORAGE MEDIUM STORING PROGRAM FOR THAT METHOD

(75) Inventors: Young-Joon Hyuong, Gyeonggi-Do (KR); Joon-Kee Chang, Gyeonggi-do (KR); Mun-Jun Seo, Seoul (KR)

(73) Assignee: NHN Corporation, Seongnam-si (KR)

( * ) Notice: Subject to any disclaimer, the term of this patent is extended or adjusted under 35 U.S.C. 154(b) by 836 days.

(21) Appl. No.: 11/571,509

(22) PCT Filed: Jul. 6, 2005

(86) PCT No.: PCT/KR2005/002169

§ 371 (c)(1),
(2), (4) Date: Dec. 29, 2006

(87) PCT Pub. No.: WO2006/006790

PCT Pub. Date: Jan. 19, 2006

(65) Prior Publication Data

US 2008/0016163 A1 Jan. 17, 2008

(30) Foreign Application Priority Data

Jul. 9, 2004 (KR) ...................... 10-2004-0053379

(51) Int. Cl.
G06F 15/16 (2006.01)
(52) U.S. Cl. .................................... 709/206; 707/999.1
(58) Field of Classification Search ................. 709/201, 709/202, 203, 205, 206, 207, 218, 219; 707/999.1
See application file for complete search history.

(56) References Cited

U.S. PATENT DOCUMENTS 5,761,421 A 6/1998 Van Hoff et al.

(Continued)

FOREIGN PATENT DOCUMENTS

JP 2002-082880 3/2002

(Continued)

OTHER PUBLICATIONS

English language abstract of Korean Publication No. 2002-003920.

(Continued)

*Primary Examiner*—Jungwon Chang
(74) *Attorney, Agent, or Firm*—H.C. Park & Associates, PLC (57) ABSTRACT

Disclosed are a system for transmitting, receiving, and posting messages, a method thereof, and a computer readable recording medium for recording a program for realizing the method in a computer. When a service subscriber generates a message and transmits the message, a first record and a second record are generated based on the transmitted message, the generated first and second messages are respectively stored and then transmitted to user terminals of an addresser and an addressee, and the user terminals display the transmitted message contents together with previously transmitted related message contents based on record fields. In this instance, the addressee is restricted to be a service subscriber. Therefore, the relationship between the transmitted message and the received message is easily detected, the addresser and the addressee conveniently manage the first and second records respectively, and the service is safe from spam mail or viruses since the messages are transmitted and received only between service subscribers.

12 Claims, 8 Drawing Sheets

U.S. PATENT DOCUMENTS

| | | | |
|---|---|---|---|
| 6,330,589 B1 * | 12/2001 | Kennedy | 709/206 |
| 6,725,228 B1 * | 4/2004 | Clark et al. | 707/102 |
| 7,031,977 B2 * | 4/2006 | Frieden et al. | 707/103 Y |
| 2003/0095096 A1 * | 5/2003 | Robbin et al. | 345/156 |
| 2004/0117448 A1 * | 6/2004 | Newman et al. | 709/206 |
| 2004/0117449 A1 * | 6/2004 | Newman et al. | 709/206 |

FOREIGN PATENT DOCUMENTS

| | | |
|---|---|---|
| JP | 2003-030216 | 1/2003 |
| JP | 2003-303159 | 10/2003 |
| KR | 2002-003920 | 1/2002 |
| KR | 2003-0017043 | 3/2003 |
| WO | WO 03/058464 | 7/2003 |

OTHER PUBLICATIONS

English language abstract of Korean Publication No. 2003-0017043.
English language abstract of Japanese Publication No. 2002-082880.

* cited by examiner

SYSTEM FOR SENDING, RECEIVING AND DISPLAYING MESSAGE, METHOD FOR SENDING, RECEIVING AND DISPLAYING MESSAGE AND COMPUTER READABLE STORAGE MEDIUM STORING PROGRAM FOR THAT METHOD

CROSS-REFERENCE TO RELATED APPLICATION

This application claims priority from Korean PCT Patent Application No. PCT/KR2005/002169, filed Jul. 6, 2005, which claims priority of Korean Patent Application No. 2004-0053379, filed Jul. 9, 2004, the contents of which are incorporated herein by reference in their entirety.

BACKGROUND OF THE INVENTION (a) Field of the Invention

The present invention relates to a system and method for transmitting, receiving, and posting a message, and a computer readable storing medium for storing a program realizing the method. More specifically, the present invention relates to a system and method for transmitting and receiving a message between user terminals connected to a network, and posting a message, and a computer readable storing medium for storing a program for realizing the method.

(b) Description of the Related Art

As network services have increased in use, various services and particularly those based on the Internet have been developed, and services for transmitting and receiving messages and posting the same on the Internet have been provided in various manners including e-mail services, note services, and bulletin board services.

The mail services for transmitting and receiving mail to/from users by using a mail transmitting server and a mail receiving server transmits long text, allows attachments of files to the mail, and provides functions of reply, transfer, and notice of reading, and also has less load in managing the mails since the transmitted or received mails are owned by addressees and addressees.

However, the mail service may be exposed to spam mail services or viruses since the mail may be transmitted/received to/from users who are not certified. In addition, the transmitted or received mail is displayed in the order of sending dates or receiving dates and no relevance between mails is displayed. Some mail clients sort the mails according to reference fields, and respective mails in each field are listed with reference to the date, and no listing process following the correlation between mails belonging to the same field is executed.

The note service controls service subscribers to transmit and receive short comments. A server for the note service has predefined tables for the note service and stores notes between addressees and addressee in records. In this instance, the capacity of notes to be sent or received is limited since the notes communicated by the service subscribers are stored in the same record, and it is also impossible to manage the attached files or notes.

The bulletin board service controls contents of subscribers to the bulletin service to be transmitted to a shared working place to share the posted contents, and it is thus safe from spam mail and viruses since the subscribers only allow transmission of contents. Also, the contents are displayed together with relevance to respective contents in the relevant contents package according to an input method.

For example, a title is provided as a reply to the original article and another reply to the reply to a header of the original article, and the start line of the title is controlled to be differently displayed. That is, a title starts from the first line of the original article, a title starts from the second line of a reply, and a title starts from the third line of another reply to the first reply so that the positions of respective contents may be found from the related contents package.

However, since the respective contents are transmitted to the shared working place, management authority is assigned to a specific user, and authority for the posted contents is only assigned to the posting user. Further, the transmitted contents of all users are displayed together, and an additional sorting function needs to be inconveniently used so as to check the posted articles of specific users.

SUMMARY OF THE INVENTION

It is an advantage of the present invention to provide a system and method for transmitting, receiving, and posting messages, and a computer readable storing medium for storing a program of realizing the method for displaying positions of respective messages communicated with service subscribers in a related message package.

It is another advantage of the present invention to provide a system and method for transmitting and receiving messages between certified users in a secure manner, and posting the messages, and a computer readable storing medium therefore.

It is still another advantage of the present invention to provide a system and method for transmitting, receiving, and posting messages, and a computer readable storing medium for allowing an addresser and an addressee to have authority over posted articles and to manage the posted articles.

In one aspect of the present invention, a system for transmitting and receiving messages between a plurality of user terminals connected to a network and posting the messages comprises: a message client for transmitting and receiving messages between a plurality of users subscribed to a service; an application server for generating a first record and a second record based on a transmitted message, storing the first and second records, and transmitting the first and second records to corresponding message clients respectively according to a request by the message client; and a user database for storing the first and second records, wherein the message client displays the transmitted message contents together with related message contents transmitted by referring to a record field.

The record field comprises a first field for indicating a related message package and a second field for indicating a corresponding message position in the related message package, and the message client expresses transmitted message contents according to the position in the related message package by referring to the first and second fields.

The application server generates a first record and a second record comprising a service user ID, a message ID, a corresponding message ID, a related message package to which the message belongs, a message position in the message package, an addresser ID, an addressee ID, a message title, and at least one record field from among message contents, and stores the first record and the second record in the user database.

The message ID of the first record is a corresponding message ID of the second record, a corresponding message ID of the first record is a message ID of the second record, and the first record and the second record are logically connected with each other.

In another aspect of the present invention, a method for transmitting and receiving a message between a plurality of user terminals connected to a network and posting the message comprises: a) transmitting a generated message; b) generating a first record and a second record for an addresser and an addressee based on the transmitted message; c) respectively storing the generated first and second records and transmitting the first record and the second record to user terminals of the addresser and the addressee; and d) displaying the transmitted message contents together with previously transmitted related message contents based on a record field. The first record and the second record comprise a service user ID, a message ID, a corresponding message ID, a related message package to which the message belongs, a message position in the message package, an addresser ID, an addressee ID, a message title, and at least one record field from among message contents.

The a) and b) above are performed when the addresser and the addressee are service subscribers. The first record and the second record are respectively stored in user databases for the addresser and the addressee.

In still another aspect of the present invention, provided is a computer readable recording medium for recording a program for realizing the method in a computer.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Figure 1:
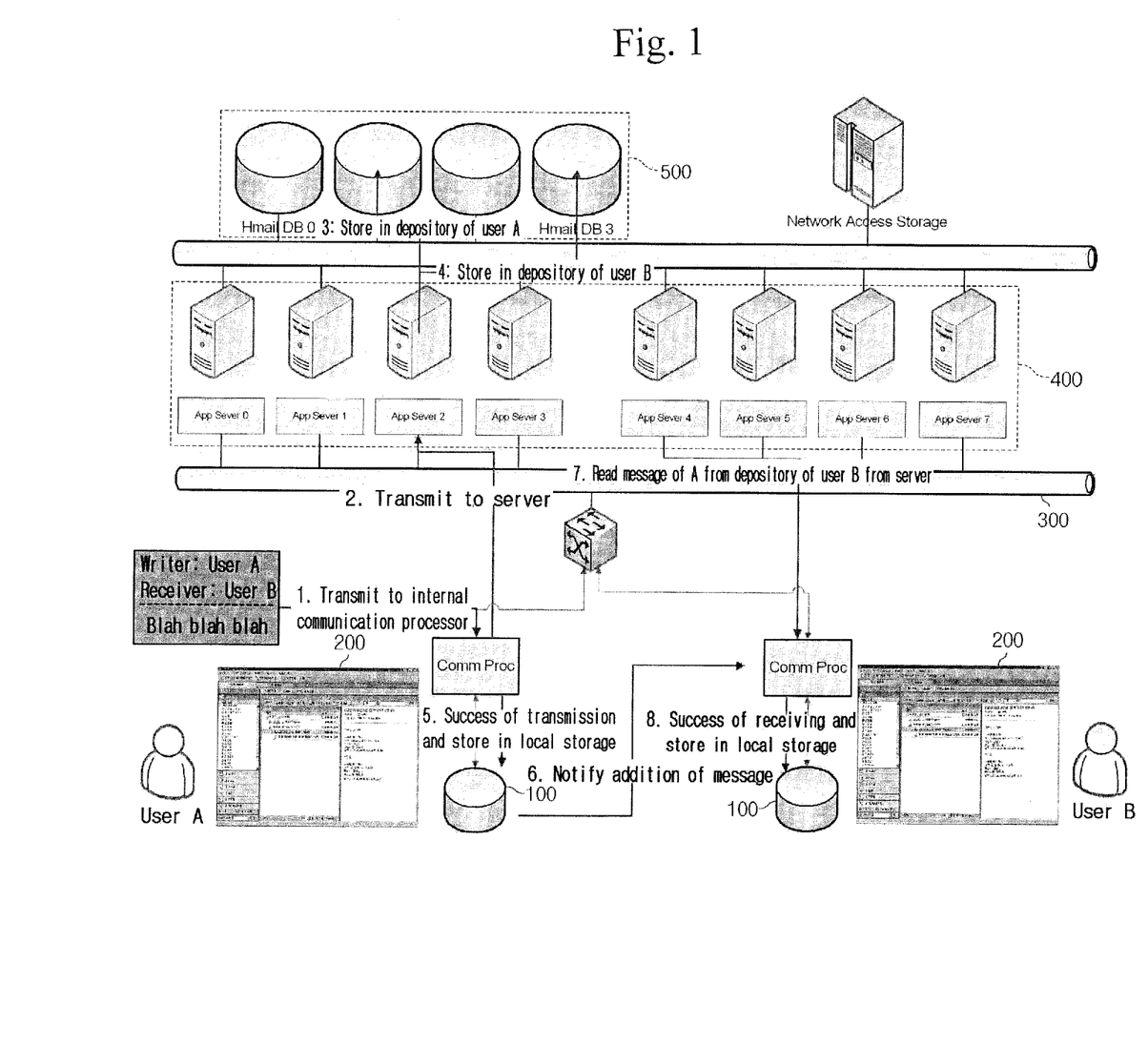
FIG. 1 shows a system for transmitting, receiving, and posting a message according to an embodiment of the present invention.

As shown in FIG. 1, the system for transmitting, receiving, and posting a message according to an embodiment of the present invention connected to a plurality of user terminals through a network includes a message client 200, an application server 400, and a user database 500.

The network includes a telephone network, the Internet, and a wireless communication network.

The user terminal is a communication device for communication with the system for transmitting, receiving, and posting a message through the network, and exemplarily includes a telephone, a wireless communication terminal, a computer, and an Internet TV, and therefore, the user may conveniently and quickly access the system by using one of PC communication, the Internet, the wireless Internet, and a telephone network.

The message client 200, an application program installed in the user terminal, provides a tool for generating a message and controls the message communicated between a plurality of users subscribed to the service to be transmitted or received through a communication processor installed in the user terminal.

In this instance, the message client 200 displays the transmitted message by referring to a corresponding record field, and displays the transmitted message together with a related message to the screen of the user terminal when a previously transmitted related message is found after referring to the record field.

It is also possible to store the transmitted record in a terminal storage unit 100 of the user terminal according to conditions.

In this instance, the terminal storage unit 100 is different from a local cache for temporarily storing data provided by a server in the general mail client program. That is, the local cache temporarily stores the data provided by the server, and represent a general technique for the mail client program to use the data stored in the local cache without requesting re-transmission of the same data from the server.

The terminal storage unit 100, however, is used by the message client to store the records stored in the local cache in a separate manner for the purpose of everlasting storage of the records, and may be usefully used for deleting the records from the user database 500 of the application server 400 and concurrently storing the records for a long period for the purpose of personal usage.

The application server 400 generates a first record for an addresser and a second record for an addressee based on a transmission message when receiving the transmission message from the message client 200. However, the application server 400 may transmit a notice of transmission failure to the message client 200 having transmitted the message when the message addressee is not a registered user.

In this instance, the first record and the second record have a service user ID, a message ID, a corresponding message ID, a related message package to which the message belongs, a message position in the message package, an addresser ID, an addressee ID, a message title, and at least one record field from among message contents.

In this instance, the message ID of the first record is a corresponding message ID of the second record, and a corresponding message ID of the first record is a message ID of the second record. Therefore, the first record and the second record are logically linked with each other through the message IDs and the corresponding message ID fields.

The user database 500 stores the first and second records according to the application server 400. In this instance, the user database 500 may be respectively given to the respective users having subscribed to the service. Therefore, the authority for the first and second records stored in the database is provided to the addresser and the addressee and is managed by them. That is, the addresser and the addressee may store or delete the first and second records through the message client 200.

Figure 2:
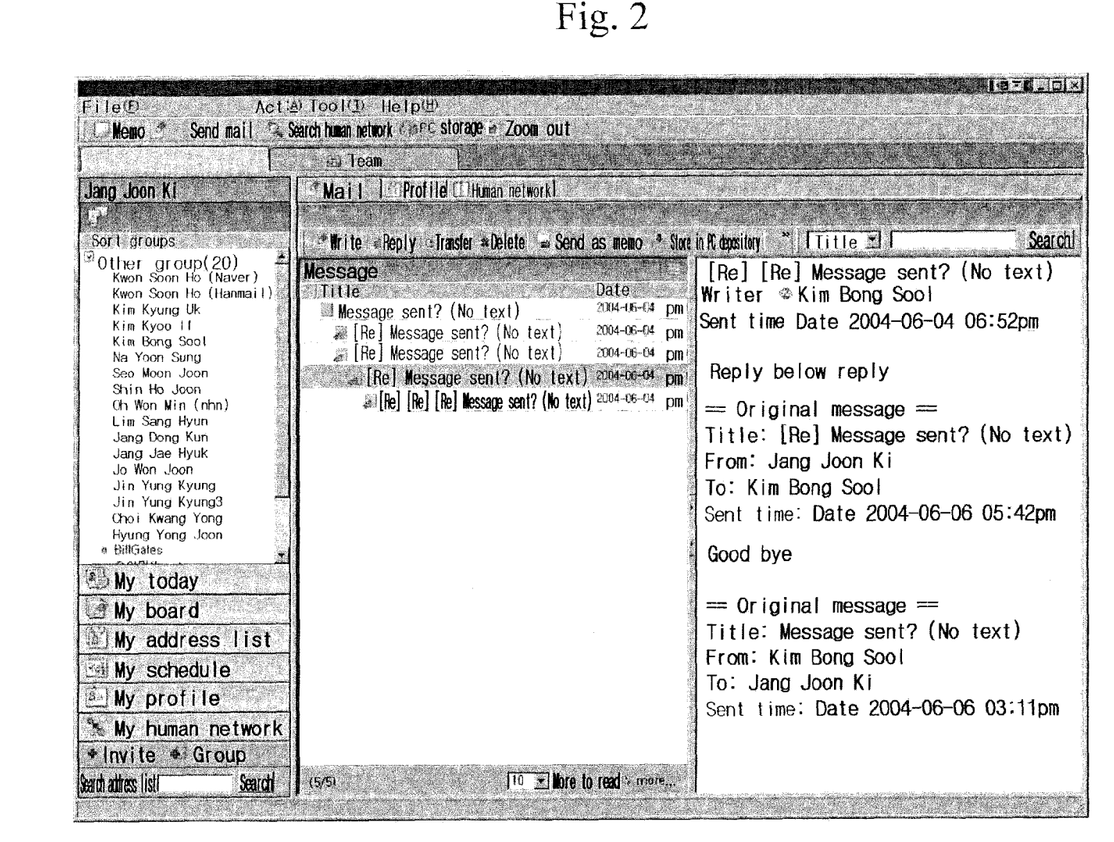
FIG. 2 shows a user interface of the system in FIG. 1.

FIG. 2 shows a user interface of the message client 200.

The message client 200 displays a list of second users who may transmit and receive messages to/from a first user and post the messages, and the list of the second users may be displayed with a predetermined group according to the first user's selection. In this instance, the first and second users are service subscribers, and the second users are one or more users who may transmit and receive messages to/from the first user and includes (2-1)th to (2-n)th users.

For example, when the first user selects a user 2-4 from among the second users given in the list, messages communicated between the first user and the (2-4)th user are displayed, and in particular, according to positions of the respective messages in the related message package.

That is, when the first user sends a message to the (2-4)th user and the (2-4)th user replies to the message, the sent message of the first user is displayed to be in an upper layer, and the replied message of the (2-4)th user is displayed to be in a lower layer with respect to the sent message of the first user. When the first user replies again to the replied message, the replied message of the first user is displayed to be in a lower layer with respect to the replied message of the (2-4)th user. Further, when the first user sends a new message to the (2-4)th user or vice versa, the new message is represented to be in a new upper layer.

The process for transmitting, receiving, and posting the message will now be described in detail.

Figure 3:
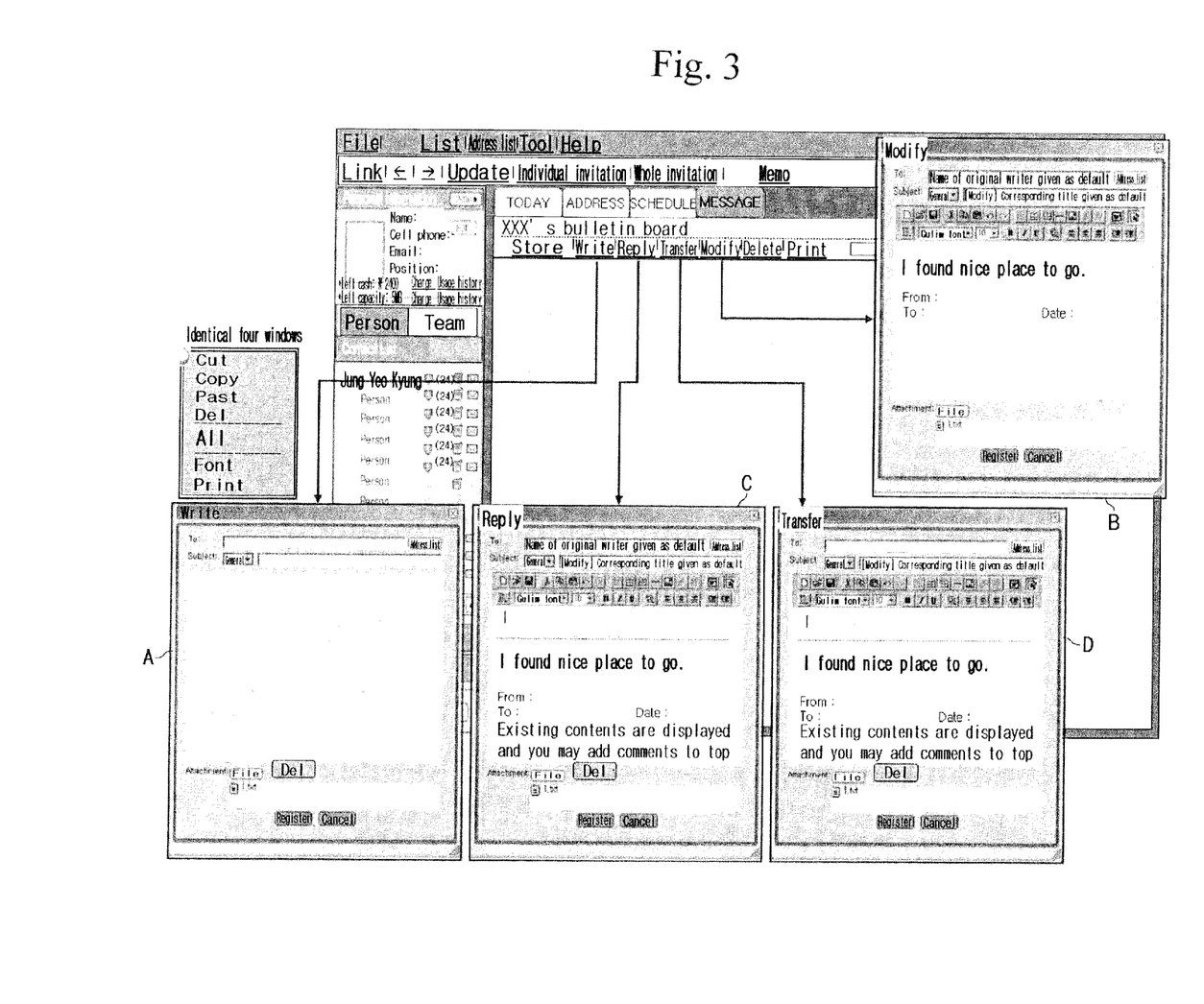
FIG. 3 shows a detailed message transmitting and receiving interface of the system in FIG. 1.

As shown in FIG. 3, the first user selects a specific user from among the second users (e.g., the (2-4)th user), generates a message, and transmits the message through the user interface of the message client 200 (A), or may modify a transmitted and posted message and transmit the modified message (B). Also, the first user may transmit a reply to the message provided by the (2-4)th user (C) or transmit the message communicated with the (2-4)th user to another user such as the (2-1)th user or the (2-2)th user (D).

In this instance, the generated, modified, or transmitted message in the cases of (A), (B), (C), and (D) is transmitted to the application server 400, and the application server 400 generates a first record and a second record for an addresser and an addressee based on the transmitted message.

Figure 4:
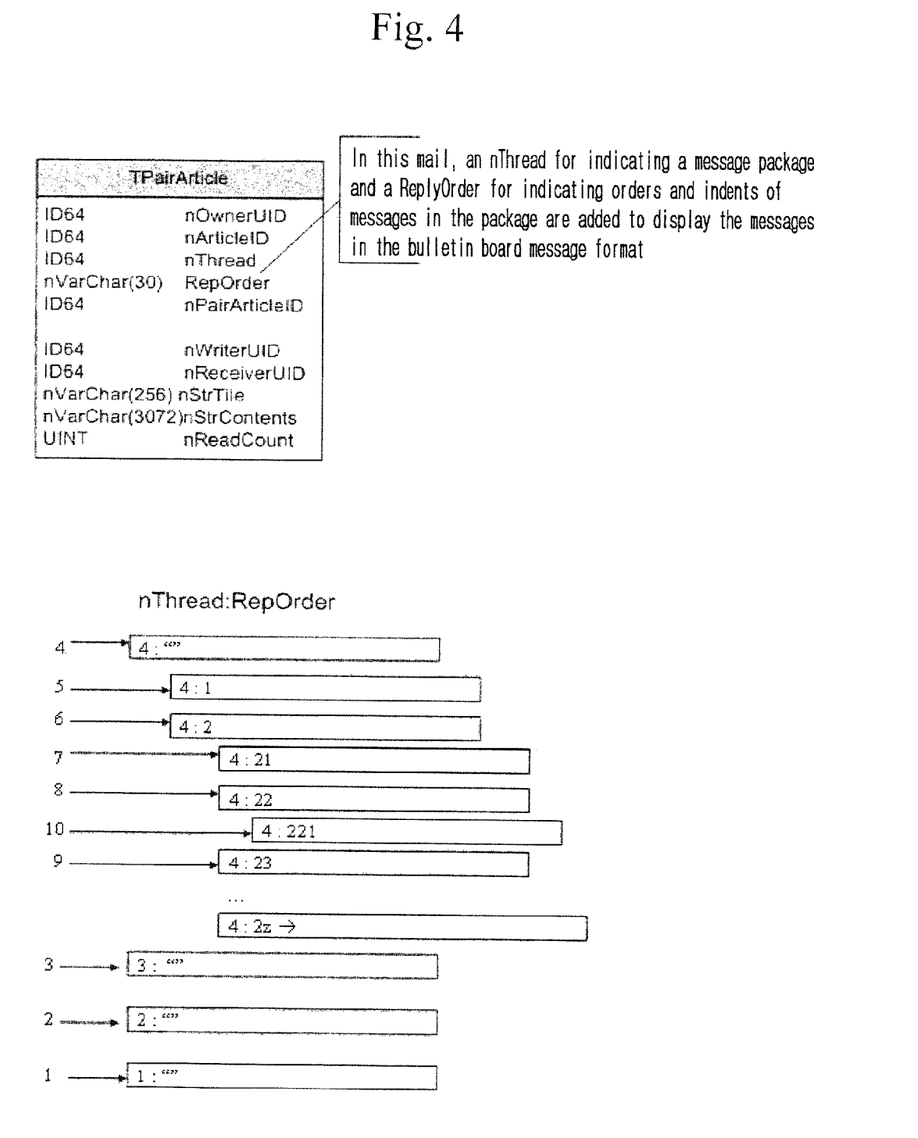
FIG. 4 shows a schema for a user database in FIG. 1.

As shown in FIG. 4, each record includes at least one record field from among a service user ID (nOwnerUID), a message ID (nArticleID), a corresponding message ID (nPairArticleID), a related message package (nThread) to which the message belongs, a message position (RepOrder) in the package, an addresser ID (nWriterID), an addressee ID (nReceiverID), a message title (nStrTitle), and a message content (nStrContents).

The service user ID (nOwnerUID) indicates a user ID to which the first record and the second record are transmitted. The message ID (nArticleID) indicates a storage address showing what order of message the first record is from among the messages stored in the addresser's user database 500. The corresponding message ID (nPairArticleID) indicates a storage address showing what order of message the second record generated corresponding to the first record is from among the messages stored in the addresser's user database 500.

The nThread shows a message packet to which the transmitted message belongs, indicates from what original message (not a reply message but an initial message for a predetermined message) the transmitted message is derived, and follows the nArticleID of the original message. That is, the nThread follows the nArticleID of the original message when the transmitted message is an original message, and the nThread follows the nThread of the original message when the transmitted message is a reply message to the original message, and since the nThread of the original message is the nArticle of the original message, the nThread of the reply message for a specific message becomes the nArticleID of the original message.

The RepOrder indicates the position of the transmitted message in the message package, and shows an order of expressing the messages and indents of messages for hierarchical expression of messages in the message package.

For example, when the message package to which the transmitted message belongs and the position in the message package are given in the format of nTread:RepOrder, notations of 1: " ", 2: " ", 3: " ", and 4: " " respectively indicate the original message of the first message package, the original message of the second message package, the original message of the third message package, and the original message of the fourth message package.

In this instance, when the first message is defined to be the message having nTread:RepOrder as 4: " ", the notations of 4:1 and 4:2 respectively indicate the first reply message and the second reply message (called second message hereinafter) for the first message, and titles of respective reply messages are displayed with a predetermined gap from the line where the title of the original message starts. Further, the notations of 4:21, 4:22 and 4:23 respectively indicate the first reply message, the second reply message (called second message hereinafter), and the third reply message for the second message, and titles of respective reply messages are displayed with a predetermined gap from the line where the title of the second message starts. In a like manner, the notation of 4:221 indicates the first reply message for the third message, and is displayed with a predetermined gap from the line where the title of the third message starts.

The nWriterID indicates an ID of the user having generated the message, the nReceiverID indicates an ID of the user who will receive the message, and the nStrTitle and nStrContents respectively indicate a subject of the message and contents of the message.

Figure 5:
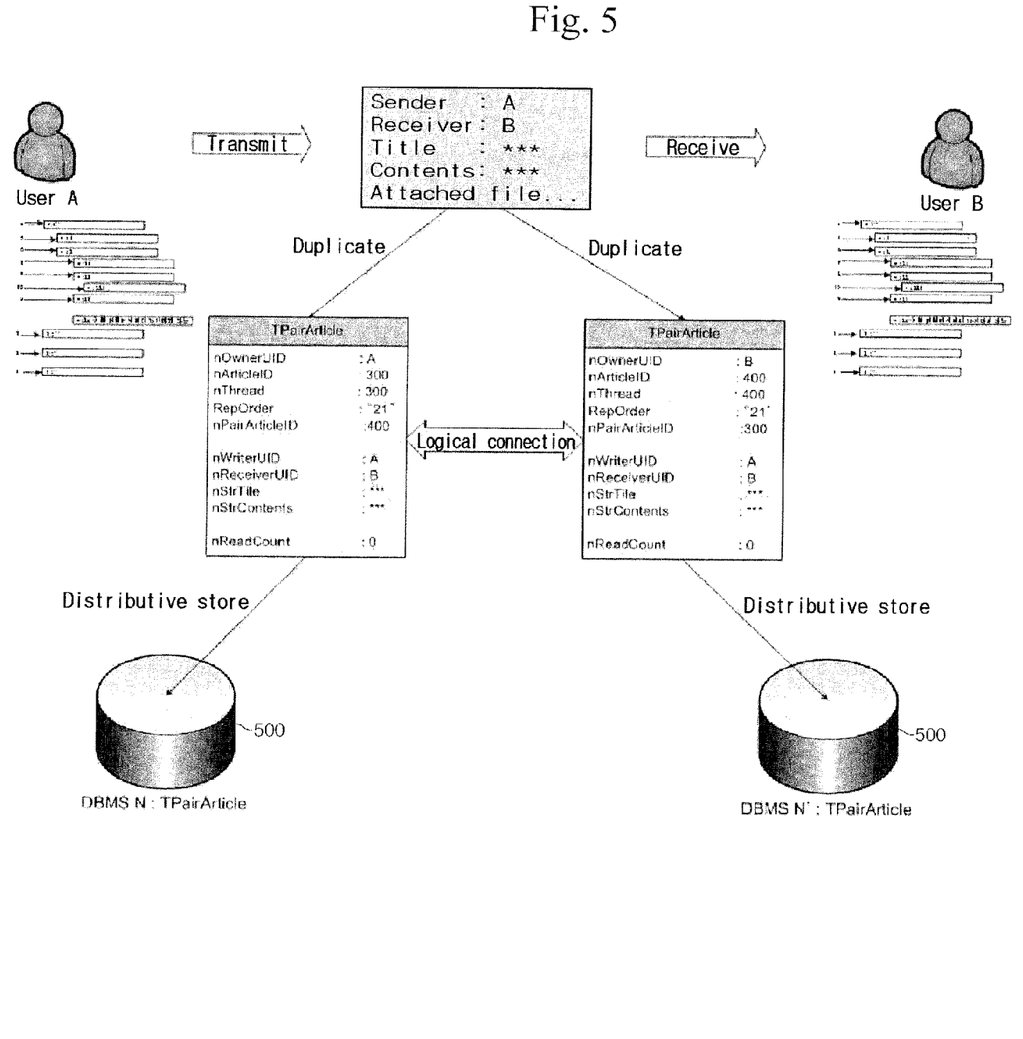
FIG. 5 shows an arrangement diagram for the user database in FIG. 1.

As shown in FIG. 5, when the user A transmits a reply message on a specific message to the user B, the application server 400 generates a first record and a second record for the user A based on the message of user A.

In this instance, since the first record is a record for the user A, the nOwnerID of the first record is given to be A, and the nWriterUID and the nReceiverUID respectively become A and B. The nThread 300 and the nRepOrder 21 indicate that the current message is a first reply message for the second reply message of the original message in the message package with the original message having the ArticleID of 300. Also, the nPairArticleID 400 shows a storage address indicating to what order of message the second record corresponds from among the messages stored in the user database 500 of the user B, and logically connects the first record and the second record.

The second record is a record for the user B, and hence, the nOwnerID of the second record becomes B, and the nWriterUID and the nReceiverUID respectively become A and B. The nThread 400 and the nRepOrder 21 indicate that the current message is the first reply message for the reply message of the original message in the message package having the ArticleID of the original message as 400. Further, the nPairArticleID of 300 shows a storage address indicating to what order of message the first record belongs from among the messages stored in the user database 500 of the user A, and logically connects the first record and the second record.

Therefore, the message for the user A is located in the message package with the ArticleID of the original message as 300. When the title of the reply message is expressed with a gap of n from the title of the original message, the title of the message is expressed with a gap of 2n from the start line of the original message. Also, the message for the user B is located in the message package with the ArticleID of the original message as 400, and the title of the message is expressed with a gap of 2n from the start line of the original message.

The application server 400 stores the first record and the second record in the user database 500 for the user A and the user database 500 for the user B. Therefore, the user A and the user B have authority on the first record and the second record and are each allowed to manage the records.

Figure 6:
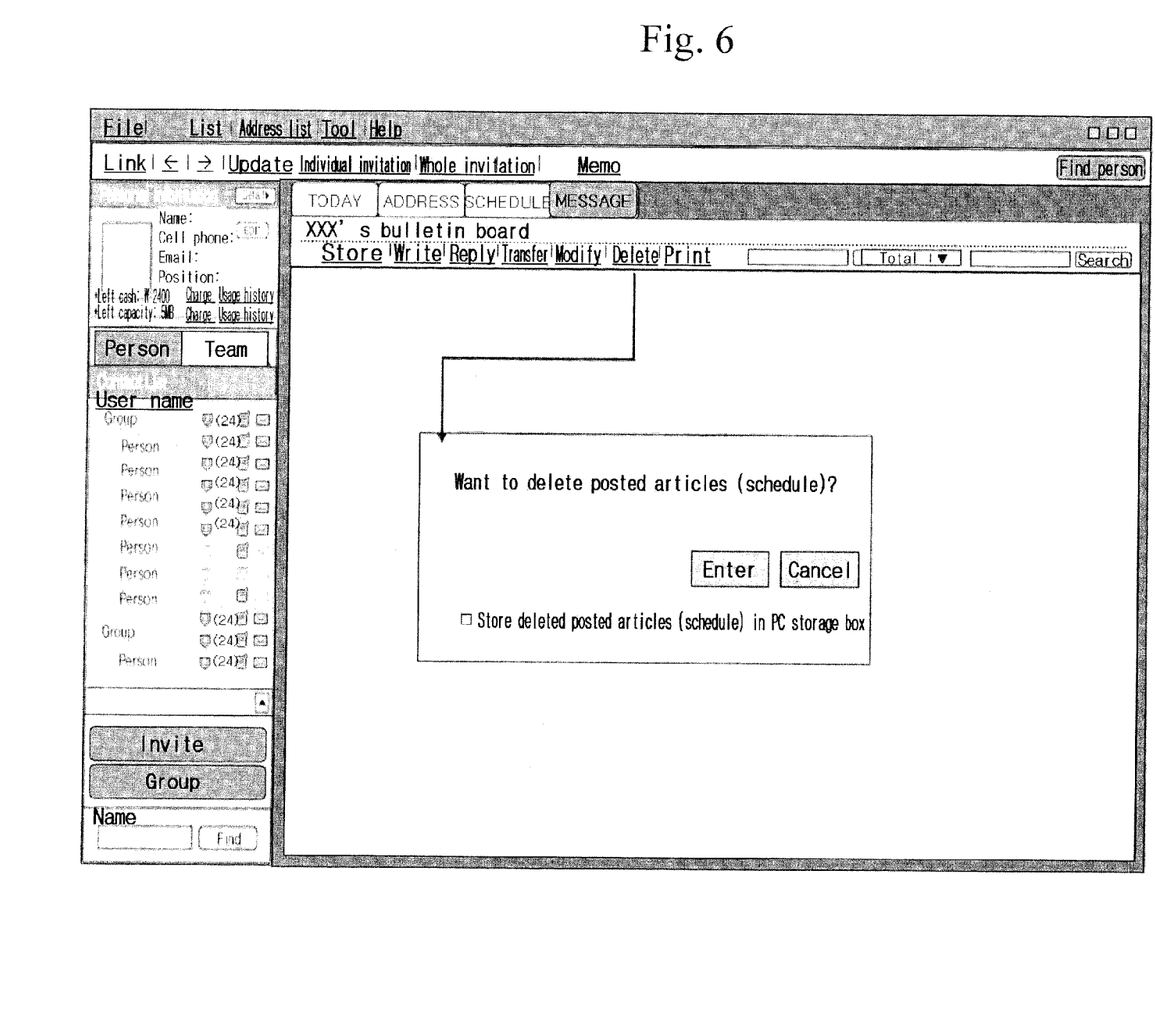
FIG. 6 shows deletion of records stored in the database.

As shown in FIG. 6, the user A and the user B have authority to delete the first record and the second record stored in the user database 500, and may delete the stored records according to respective user selections.

For example, the user A cannot check the corresponding message through the message client 200 when the user A deletes the first record, but the user B may check the corresponding message through the message client 200 when the user B does not delete the second record. In this instance, the respective records may be separately stored in the terminal storage unit 100 of the user terminal according to the user selection, thereby preventing other user's access to the record and storing the record for a long time.

Figure 7:
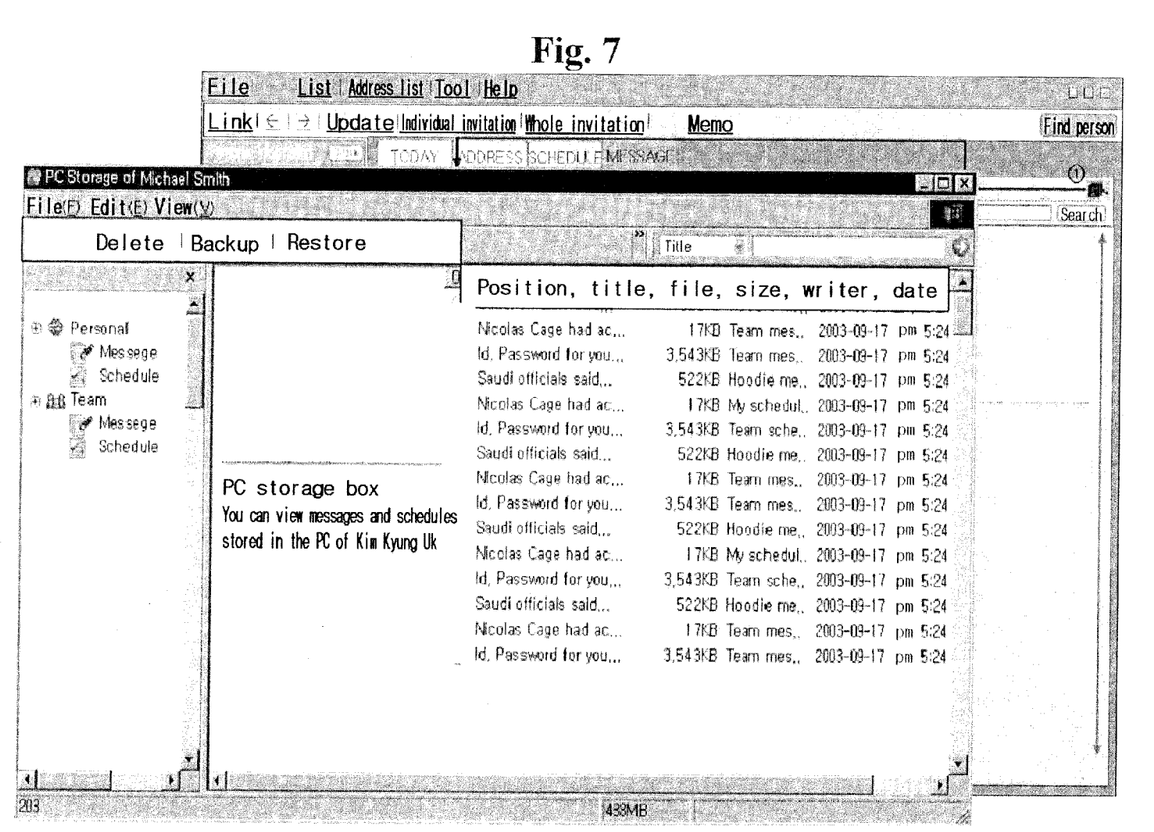
FIG. 7 shows a status in which records are stored in a user terminal.

That is, as shown in FIG. 7, the user A or the user B may store the first record or the second record in the terminal storage unit 100 of the respective user terminal through the message client. In this instance, the first record or the second record may be stored in the terminal storage unit 100 for a long time when the same is deleted in the user database 500 of the application server 400, and in addition, the first record or the second record may be stored forever according to the user selection.

Accordingly, when the user desires to store a specific record forever or for a personal purpose, the corresponding record is deleted in the user database 500, the access possibility by other users is prevented, and the danger of data drain is reduced. Concurrently, the corresponding can be stored for an eternal personal purpose since it is separately stored in the terminal storage unit 100. In addition, a load of the user database is reduced since the amount of records stored in the user database 500 is reduced.

Figure 8:
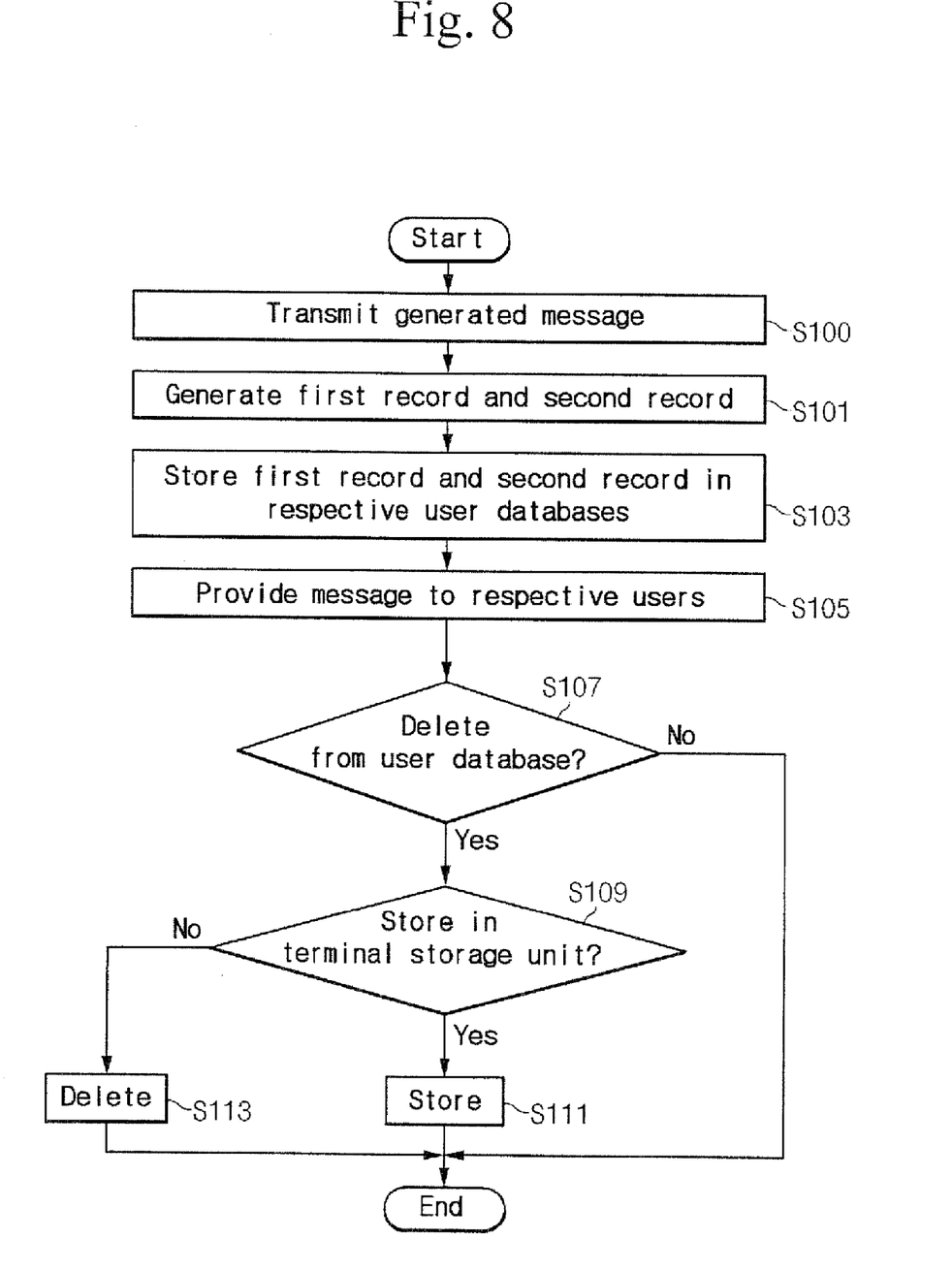
FIG. 8 shows an operational flowchart for the system in FIG. 1.

Referring to FIG. 8, a method for transmitting and posting a message will now be described based on the above-described method for transmitting the message from the user A to the user B.

When the user A generates a message and sends it to the user B in step S100, the application server 400 generates a first record and a second record based on a transmitted message in step S101, and the first record and the second record are stored in the user database 500 for the user A and the database 500 for the user B in step S103.

In this instance, the first record and the second record include at least one record field from among a service user ID (nOwnerUID), a message ID (nArticleID), a corresponding message ID (nPairArticleID), a related message package (nThread) to which the message belongs, a message position (RepOrder) in the package, an addresser ID (nWriterID), an addressee ID (nReceiverID), a message title (nStrTitle), and a message content (nStrContents).

The message ID of the first record indicates a corresponding message ID in the second record, a corresponding message ID in the first record is a message ID of the second record, and the first record and the second record are logically connected with each other. The message is expressed to the user A and the user B according to the position of the corresponding message in the message package based on the nThread and the RepOrder in step S105.

That is, when the nThread and the RepOrder of the first record in the case of the user A are given as 300 and 21, the corresponding message becomes a first reply message on the second reply message of the original message in the message package with the ArticleID of 300. The nPairArticleID of 400 shows a storage address indicating to what order of message the second record corresponds from among the messages stored in the user database 500 of the user B, and logically connects the first record and the second record.

Therefore, the message in the case of the user A is located in the message package with the ArticleID of the original message as 300. When the title of the reply message is expressed with a gap of n from the title of the original message, the title of the message is expressed with a gap of 2n from the start line of the original message.

When the nThread and the RepOrder of the second record in the case of the user B are given as 400 and 21, the corresponding message becomes a first reply message on the second reply message of the original message in the message package with the ArticleID of 400. The nPairArticleID of 300 shows a storage address indicating to what order of message the first record corresponds from among the messages stored in the user database 500 of the user A, and logically connects the first record and the second record.

Hence, the message in the case of the user B is located in the message package with the ArticleID of the original message as 400, and the title of the message is expressed with a gap of 2n from the start line of the original message when the title of the reply message is expressed with a gap of n from the title of the original message.

Since the first record and the second record are respectively stored in the user database 500 of the user A and the user database 500 of the user B, authority and management for the records are respectively provided to the user A and the user B. Therefore, the user A or the user B may delete the records according to selection in steps S107, S109, and S113. That is, the user A or B may delete the records stored in the user database 500 when the user does not desire to store a specific record in the user database 500.

In this instance, the respective records may be separately stored in the terminal storage unit 100 of the user terminal according to the user selection in steps S109 and S111. In this case, the user may store the corresponding message forever for a personal purpose and prevent other user's access to the corresponding record, and the above-noted process is useful for obtaining further capacity of the user database 500 for storing records.

As described, the messages transmitted and received between service subscribers are displayed for the respective service subscribers. That is, the message client shows a list of service subscribers, and displays messages transmitted between the first user and a selected second user when the first user selects one of second users given in the list.

Further, the respective messages are expressed to show positions of the messages in the related message package. That is, it is possible for the user to roughly know the subject of the transmitted or received message in cooperation with the related message, determine whether the message is an original message or a reply message, and determine to what message the reply corresponds when the message is found to be a reply message.

Also, the messages are safe from spam or viruses since they are transmitted and received between certified users.

In addition, the authority and management on the posted messages are performed conveniently by the respective users since the two records generated based on the transmitted message are respectively stored in the databases of the addresser and the addressee. While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A system for transmitting, receiving and posting messages between a plurality of user terminals via a network, the system comprising:
    a message client to transmit and to receive a message among a plurality of users subscribed to a service;
    an application server to generate a first record and a second record associated with the message based on contents of the message, to store the first record and the second record corresponding to the transmitted message, and to transmit the first record and the second record to the message client according to a request by the message client; and
    a user database to store the first record and the second record,
    wherein the first record and the second record comprise a service user identification (ID), a message identification (ID), a corresponding message identification (ID), a related message package to which the message belongs, a message position in the message package, an addresser identification (ID), an addressee identification (ID), a message title, and a record field, and
    wherein the message client displays the transmitted message together with a message previously being transmitted from the message client by referring to the record field.

2. The system of claim 1, wherein the record field comprises a first field to indicate a related message package and a second field to indicate a corresponding message position in the related message package, and
    the message client displays the transmitted message according to the position in the related message package by referring to the first field and the second field.

3. The system of claim 1, wherein the message identification (ID) of the first record is the same as the corresponding message identification (ID) of the second record, wherein a corresponding message identification (ID) of the first record is the same as the message identification (ID) of the second record, and wherein the first record and the second record are logically connected with each other.

4. The system of claim 1, wherein the application server is configured to transmit a notice of failure to the message client having received a message in response to a detection that a message addressee is not a user subscribed to the service.

5. The system of claim 1, wherein the user database is provided to a plurality of users subscribed to the service.

6. The system of claim 1, wherein the message client is configured to store the transmitted record in the user terminal.

7. A method for transmitting, receiving and posting a message a among plurality of user terminals via a network, the method comprising:
    transmitting a message;
    generating a first record and a second record for an addresser and an addressee based on the transmitted message, wherein the first record and the second record correspond to the transmitted message and comprise a service user identification (ID), a message identification (ID), a corresponding message identification (ID), a related message package to which the message belongs, a message position in the message package, an addresser identification (ID), an addressee identification (ID), a message title, and a record field;
    storing the generated first record and second record and transmitting the first record and the second record to a user terminal of the addresser and a user terminal of the addressee; and
    displaying the transmitted message together with a message previously being transmitted from the message client by referring to the record field.

8. The method of claim 7, wherein the record field comprises a first field to indicate a related message package and a second field to indicate a corresponding message position of the related message package, and wherein
    displaying the transmitted message comprises displaying the transmitted message according to a position in the related message package based on the first field and the second field.

9. The method of claim 7, wherein the message identification (ID) of the first record is the same as the corresponding message identification (ID) of the second record, wherein a corresponding message identification (ID) of the first record is the same as the message identification (ID) of the second record, and wherein the first record and the second record are logically connected with each other.

10. The method of claim 7, wherein the first record and the second record are stored in a user database for the addresser and the addressee.

11. The method of claim 7, further comprising storing the transmitted record in the user terminal according to a user selection.

12. A non-transitory computer readable recording medium comprising a program configured to perform a method of claim 7.

* * * * *